United States Patent [19]

Ohashi et al.

[11] Patent Number: 4,755,022
[45] Date of Patent: Jul. 5, 1988

[54] ZERO DISPERSION SINGLE MODE OPTICAL FIBER WITH CENTER CORE AND SIDE CORE IN THE 1.5 μM WAVELENGTH REGION

[75] Inventors: Masaharu Ohashi; Nobuo Kuwaki; Shigeyuki Seikai; Naoshi Uesugi, all of Mito; Chihaya Tanaka, Katsuta, all of Japan

[73] Assignee: Nippon Telegraph and Telephone Corporation, Tokyo, Japan

[21] Appl. No.: 901,619

[22] Filed: Aug. 29, 1986

[30] Foreign Application Priority Data

Sep. 2, 1985 [JP] Japan .................... 60-193412

[51] Int. Cl.⁴ ............................................. G02B 6/22
[52] U.S. Cl. ............................. 350/96.33; 350/96.30; 350/96.31
[58] Field of Search ............. 350/96.30, 96.31, 96.33, 350/96.29

[56] References Cited

U.S. PATENT DOCUMENTS

| | | | |
|---|---|---|---|
| 3,997,241 | 12/1976 | Nishida et al. | 350/96.33 |
| 4,306,767 | 12/1981 | Kawachi et al. | 350/96.33 |
| 4,402,570 | 9/1983 | Chang | 350/96.30 |
| 4,412,722 | 11/1983 | Carnevale et al. | 350/96.31 |
| 4,436,368 | 3/1984 | Keck | 350/96.33 |
| 4,465,334 | 8/1984 | Siemsen et al. | 350/96.33 |
| 4,516,826 | 5/1985 | Paek | 350/96.31 |

FOREIGN PATENT DOCUMENTS

| | | |
|---|---|---|
| 0026937 | 4/1981 | European Pat. Off. . |
| 0083843 | 7/1983 | European Pat. Off. . |
| 0127408 | 12/1984 | European Pat. Off. . |
| 53-97849 | 8/1978 | Japan . |
| 2035601 | 6/1980 | United Kingdom . |
| 2071351 | 9/1981 | United Kingdom . |
| 2105488 | 3/1983 | United Kingdom . |
| 2118321 | 10/1983 | United Kingdom . |
| 2136239 | 9/1984 | United Kingdom . |
| 2140169 | 11/1984 | United Kingdom . |

OTHER PUBLICATIONS

Paek et al, "Dispersionless Single-Mode Lightguides with α Index Profiles", 1981, vol. 60, No. 5, The Bell System Technical Journal, pp. 583-598.

Cohen et al, "Tailoring Zero Chromatic Dispersion into the 1.5-1.6 μm Low-Loss Spectral Region of Single-Mode Fibres", Electronic Letters, 1979, vol. 15, No. 12, pp. 334-335.

Tanaka et al, "An Exact Analysis of Cylindrical Fiber with Index Distribution by Matrix Method and Its Application to Focusing Fiber", The Transactions of the Institute of Electronics and Communication Engineers of Japan, vol. E59, No. 11, Nov. 1976, pp. 1-8.

Morishita et al, "On the Accuracy of Scalar Approximation Technique in Optical Fiber Analysis", *IEEE Transactions on Microwave Theory and Techniques*, 1980, vol. MTT-28, No. 1, pp. 33-36.

Primary Examiner—John Lee
Assistant Examiner—Michael Menz
Attorney, Agent, or Firm—Spencer & Frank

[57] ABSTRACT

A 1.5 μm zero dispersion single mode optical fiber comprising a center core, a side core disposed on an outer side of the center core and having a refractive index lower than that of the center core, and a cladding portion disposed on an outer side of the side core. Each of the refractive indices of the center core and the side core has a step-like profile in the direction of the radius of the optical fiber. The bending loss is low. The mode field diameter can be increased without deteriorating the bending loss, and the splice loss can be reduced. The chromatic dispersion varies only to a small extent with respect to changes in the core diameter, so that the zero dispersion wavelength can be well controlled.

14 Claims, 12 Drawing Sheets

BENDING PROPERTY

ZERO DISPERSION SINGLE MODE OPTICAL FIBER WITH CENTER CORE AND SIDE CORE IN THE 1.5 μM WAVELENGTH REGION

BACKGROUND OF THE INVENTION

1. Field of the Invention

The present invention relates to a single mode optical fiber and more particularly to a single mode optical fiber for use in optical communications that is not susceptible to loss by bending when said fiber is formed into a cable and can cause a chromatic dispersion, which is a cause of deterioration in the transmission bandwidth, to be zero at a wavelength of approximately 1.5μm at which optical fiber loss is minimized.

2. DESCRIPTION OF THE PRIOR ART

A condition of light propagating in an optical fiber is determined by a normalized frequency V. When the wavelength being used is λ, V is given by the following equation.

$$V = \frac{2\pi}{\lambda} n_m a \sqrt{2\Delta}$$

In the above equation, $n_m$ is a core refractive index and a is a core radius. $\Delta$ is a value of a relative refractive index difference defined as $$\Delta = \frac{n_m^2 - n_2^2}{2n_m^2}$$

when a refractive index of a cladding is $n_2$. It is known that in a step-index optical fiber, the optical fiber is in single mode when $V < 2.4$ and the transmission bandwidth of a single-mode optical fiber is limited by chromatic dispersion. The chromatic dispersion is given by the sum of the material dispersion dependent on the fiber material and the waveguide dispersion caused by the refractive index profile of the fiber.

The material dispersion of silica optical fiber is positive in a longer wavelength region of a wavelength over 1.3μm. On the other hand, the waveguide dispersion is negative in a so-called single mode region in the case of a step-type fiber. Consequently, it is clear that at a wavelength over 1.3μm the chromatic dispersion given by the sum of these values can be made to be zero. On the other hand, the chromatic dispersion of a usual single mode optical fiber (step-type) designed for 1.3μm band ($\Delta = 0.003$, $2a = 10\mu m$) is a large value of 16–20ps/km/nm in the 1.5μm wavelength region, so that such fiber is not suited to optical communication requiring ultra-wide bandwidth. Therefore, in order to make the dispersion zero in the 1.5μm wavelength region (1.51–1.59μm), it is sufficient that $\Delta$ be larger than 0.004 in the vicinity of $V \simeq 1$ for step-type optical fiber (alpha index profile type). In this case, the radius of the core is small so that the arrangement is likely to have a larger bending loss.

The following approximation can be made for a splice loss $\alpha_s$ with respect to an axial displacement d of a fiber.

$$\alpha_s = 4.3 \, (d/W)^2 \, [dB]$$

In this equation, W indicates a mode field radius. Consequently, when the axial displacement d is constant, the splice loss $\alpha_s$ becomes smaller as the mode field diameter 2W increases. Furthermore, as the mode field diameter 2W becomes smaller, a power is better confined inside the core, so that the bending loss decreases. However, when the mode field diameter 2W is large, the splice loss $\alpha_s$ decreases, but the bending loss increases. Consequently, the relationship between the bending loss and the splice loss is traded off against the size of the mode field diameter 2W. For this reason, in an alpha index profile type 1.5μm zero dispersion fiber, there is a disadvantage that the mode field diameter cannot be made large.

FIG. 1 illustrates the relationship between a mode field diameter 2W of a conventional alpha index type 1.5μm band zero dispersion fiber and an allowable bending radius R*. The allowable bending radius R* is defined as the bending radius for the case in which a bending loss of 0.01dB/km occurs when an optical fiber is bent uniformly. Furthermore, the mode field diameter 2W is a parameter expressing an expansion of the field of the lowest mode propagating through the optical fiber. In a conventional 1.3μm band zero dispersion fiber, the allowable bending radius R* at 1.3μm is 4cm and in this case, it has been confirmed that there is no increase in loss when the fiber is formed into a cable. That is, R* = 4cm is the standard of the allowable bending radius when optical fiber is formed into a core wire or a cable. As seen in FIG. 1, in an alpha-power index profile 1.5μm band zero dispersion fiber, when the mode field diameter exceeds 8μm, the allowable bending radius is larger than that for a conventional 1.3μm band zero dispersion optical fiber at 1.3μm, so that the arrangement is likely to increase the loss when the fiber is formed into a coated fiber or a cable.

To overcome this disadvantage, Japanese patent application Laying-open No. 53-97849 entitled "Single Mode Optical Fiber" laid open on Aug. 26, 1978 discloses an arrangement having improved bending loss characteristics in which an expansion of the field is made smaller than that of a conventional step-type index single mode optical fiber by making the refractive index of the center portion of the core larger than that of the remaining or peripheral portion of the core in a conventional step-type refractive index profile.

In this disclosure, however, there is a disadvantage that it is not possible to obtain zero dispersion and good bending characteristics as well as a reduced splice loss in the 1.5μm wavelength region.

Furthermore, there is a disadvantage of poor manufacturability because of a large variation in the dispersion value with respect to a variation in core diameter in the alpha index profile type 1.5μm zero dispersion fiber.

In order to solve the above disadvantages, European patent application Laying-open No. 0127408 entitled "Optical Waveguide Fiber" laid open on May 12, 1984 has proposed a segment-core type zero dispersion fiber having a core composed of at least two concentric portions surrounding the center portion of the core and including one or more regions which are disposed between the two concentric portions and in which refractive indices are lower than the concentric portions. However, this fiber has a complicated refractive index profile, so that the control of the refractive index profile in the direction of the radius of the optical fiber is complicated in the fabrication process of the fiber. This means that it is difficult to control the refractive index profile.

SUMMARY OF THE INVENTION

With the above in view, therefore, it is an object of the present invention to provide a single mode optical fiber having a low bending loss, a low splice loss and good controllability of zero dispersion wavelength without involving a complex refractive index profile.

It is another object of the present invention to provide a single mode optical fiber in which the refractive index profile is easily controlled during fabrication of the optical fiber.

It is a further object of the present invention to provide a single mode optical fiber suitable for 1.5μm optical transmission.

It is a still further object of the present invention to provide a single mode optical fiber that eliminates the above disadvantages and which is suitable for manufacturing by a VAD method.

In order to achieve the above objects, a single mode optical fiber according to the present invention comprises:

a center core;

a side core disposed on an outer side of the center core and having a refractive index lower than that of the center core; and a cladding portion disposed on an outer side of the side core;

each of refractive indices of the center core and the side core having a step-like profile in a direction of a radius of the optical fiber; and $$0.1 \leq R\Delta \leq 0.3 \text{ and } \Delta_1 \geq 0.005$$

when $R\Delta = \Delta_2/\Delta_1$, and a relative refractive index difference $\Delta_1$ between the center core and the cladding portion is $$\Delta_1 = (n_1^2 - n_2^2)/2n_1^2$$

where $n_1$ is a maximum refractive index of the center core, and $n_2$ a refractive index of the cladding portion, and a relative refractive index difference $\Delta_2$ between the side core and the cladding portion is $$\Delta_2 = (n_3^2 - n_2^2)/2n_3^2$$

where $n_3$ is a maxium refractive index of the side core.

Here, the profile of the side core may have at least a small portion having a constant refractive index from the innermost position of the profile of the side core.

The center core may have a graded-type refractive index profile.

The center core may have a step-type or substantially step-type refractive index profile.

The center core may have a triangular refractive index profile or trapezoidal refractive index profile.

The side core may have a step-type or substantially step-type refractive index profile.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

An optical fiber according to the present invention is an optical fiber having a step-like refractive index profile which has a center core and a side core or lower refractive index core having a lower refractive index than the above-mentioned center core and formed on the outer periphery side of that center core and which further has a clad portion formed on the outer periphery side of the above-mentioned side core. In the above-mentioned optical fiber, it is assumed that a relative refractive index difference between the center core and the clad portion is $\Delta_1$, and a relative refractive index difference between the side core and the clad portion is $\Delta_2$, and that $R\Delta = /\Delta_2/\Delta_1$. $R\Delta$ and $\Delta_1$ have values in ranges $0.1 \leq R\Delta \leq 0.3$ and $\Delta_1 \geq 0.005$. Here, $\Delta_1$ indicates $$\Delta_1 = \frac{n_1^2 - n_2^2}{2n_1^2} \simeq \frac{n_1 - n_2}{n_1}$$

where $n_1$ is the maximum refractive index of the center core and $n_2$ is the refractive index of the cladding portion. $\Delta_2$ indicates $$\Delta_2 = \frac{n_3^2 - n_2^2}{2n_3^2} \simeq \frac{n_3 - n_2}{n_3}$$

where $n_3$ is the maximum refractive index of the side core and $n_2$ is the refractive index of the clad portion.

By setting the values of $R\Delta$ and $\Delta_1$ in the ranges described above, the material dispersion and the waveguide dispersion are cancelled mutually to realize zero dispersion.

Figure 1:
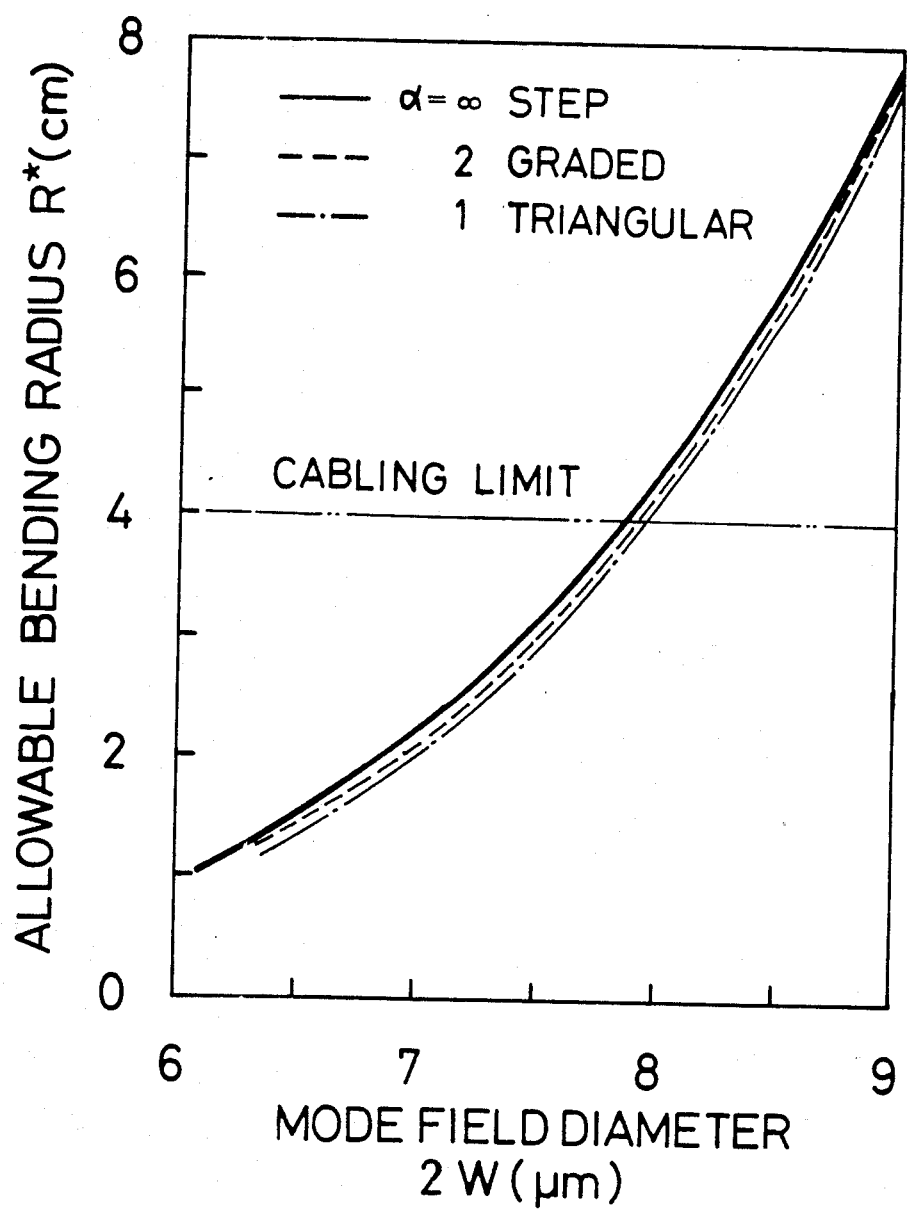
FIG. 1 is a characteristics curve graph illustrating a relationship between a mode field diameter and an allowable bending radius of an alpha-power index profile 1.5μm zero dispersion single mode optical fiber.
Figure 2:
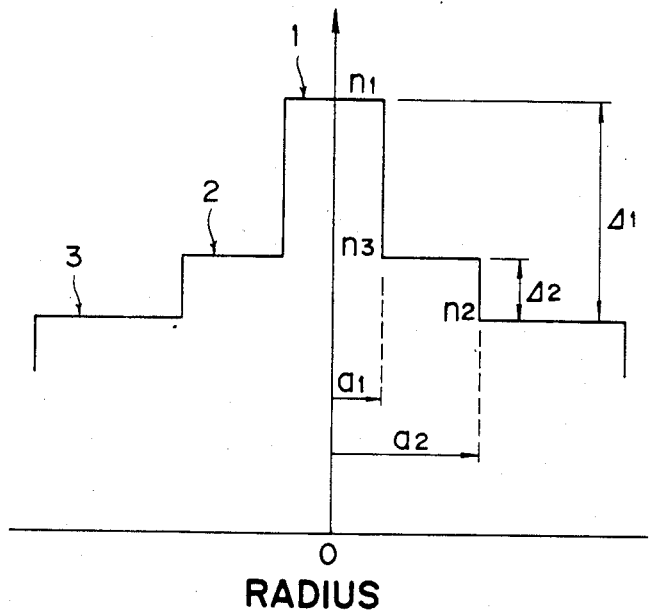
FIG. 2 illustrates a refractive index profile of an embodiment of an optical fiber according to the present invention.

FIG. 2 shows a refractive index profile in the direction of radius in an embodiment of an optical fiber according to the present invention when the center core has a step index (step-type) profile.

Figure 3:
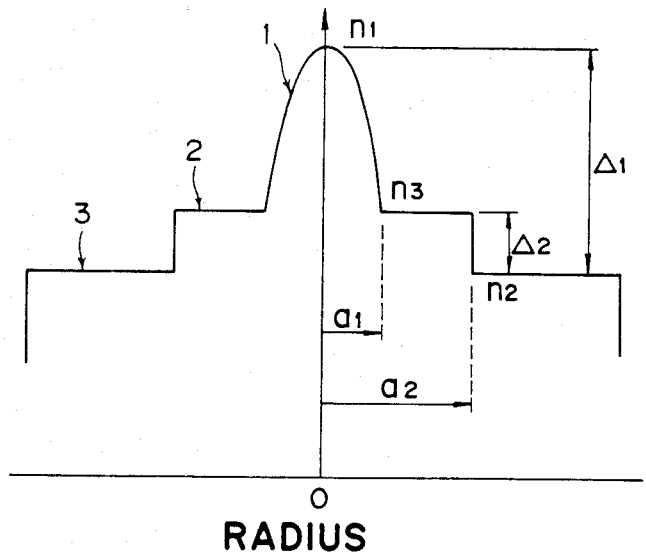
FIG. 3 illustrates a refractive index profile of another embodiment of an optical fiber according to the present invention.

FIG. 3 shows a refractive index profile in the direction of radius of an embodiment of an optical fiber according to the present invention when the center core has a graded index (graded-type) profile.

In these drawings, reference numeral 1 denotes a center core. Reference numeral 2 denotes a side core having a lower refractive index than the center core 1 and formed on the outer periphery side of the center core 1. Reference numeral 3 denotes a cladding portion surrounding the side core 2.

As is clear from FIGS. 2 and 3, an optical fiber according to the present invention has a step-like arrangement having a lower refractive index core 2 on the outer periphery side of the center core 1, and a cladding portion 3 on the outer periphery side of that lower refractive index core 2. The lower refractive index core 2 and the cladding portion 3 are adjusted so that their refractive indices vary as closely as possible in a step-like profile, and the refractive index ratio $R\Delta$ is set within the range of the present invention mentioned above, that is, $0.1 \leq R\Delta \leq 0.3$.

In the embodiments shown in FIGS. 2 and 3, the refractive index profile of the center core 1 in the direction of radius is given by the following equation when a maximum refractive index at the center of the core is $n_1$:

$$n_1 \left( 1 - \left( \frac{n_1^2 - n_3^2}{n_1^2} \right) \left( \frac{r}{a_1} \right) \alpha \right)^{\frac{1}{2}}$$
$$(r \leq a_1)$$

where r is a distance from the center of the optical fiber. $a_1$ is the radius of the center core. $n_3$ is the maximum refractive index of the side core 2. $\alpha$ is a profile parameter of the refractive index profile. When $\alpha = 1$, the profile is triangular-type, when $\alpha = 2$, the profile is graded-type (FIG. 3), and when $\alpha = \infty$, the profile is step-type (FIG. 2). In this manner, the refractive index profile $n(r)$ of the center core changes according to the above equation.

In FIGS. 2 and 3, $a_2$ represents the radius of the side core and Ra is defined by the relaitonship Ra=$a_1/a_2$, where Ra has a value in the range $0 < Ra < 1$.

Figure 4A:
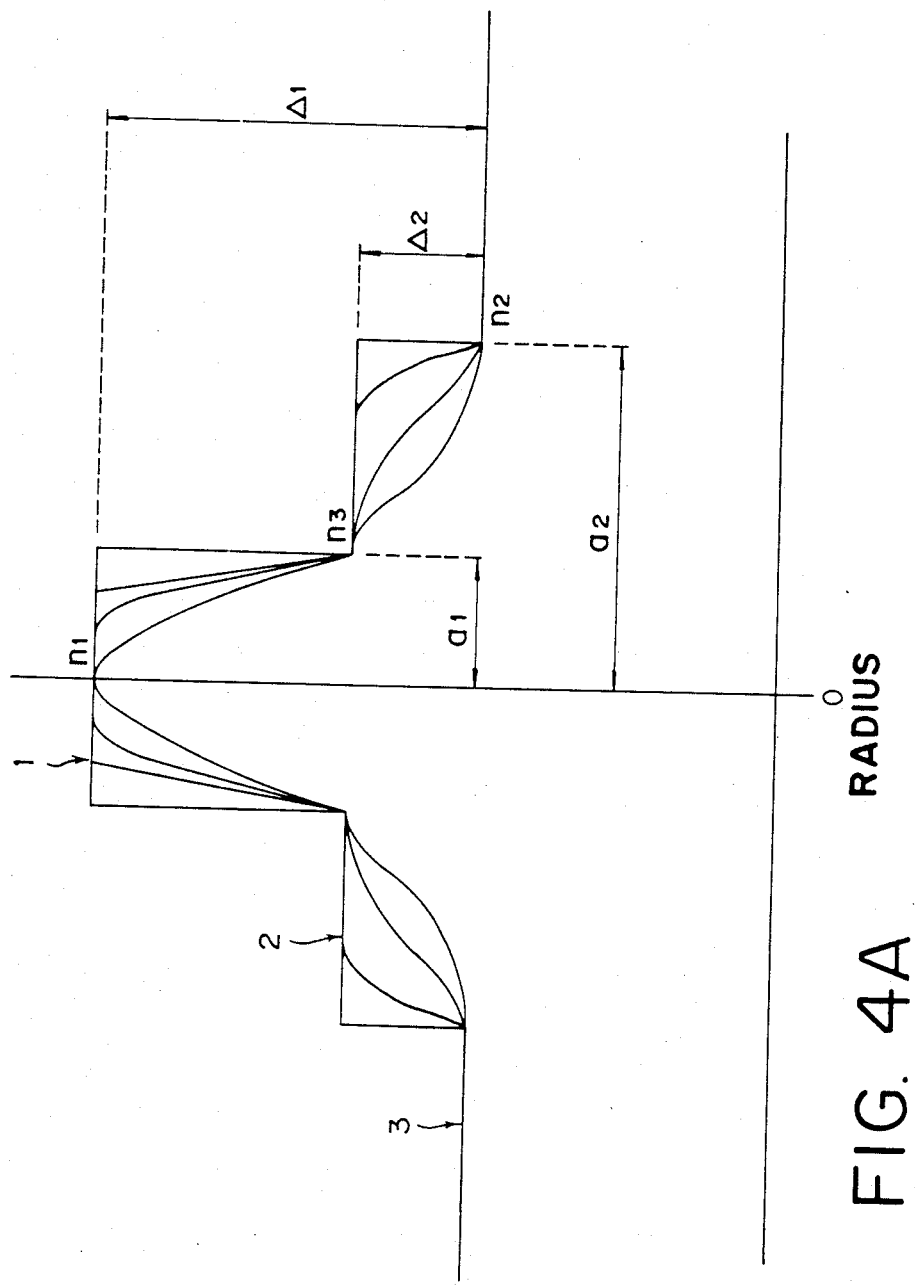
FIGS. 4A and 4B are explanatory diagrams illustrating various refractive index profiles of various step-like arrangements in embodiments of the present invention.
Figure 4B:
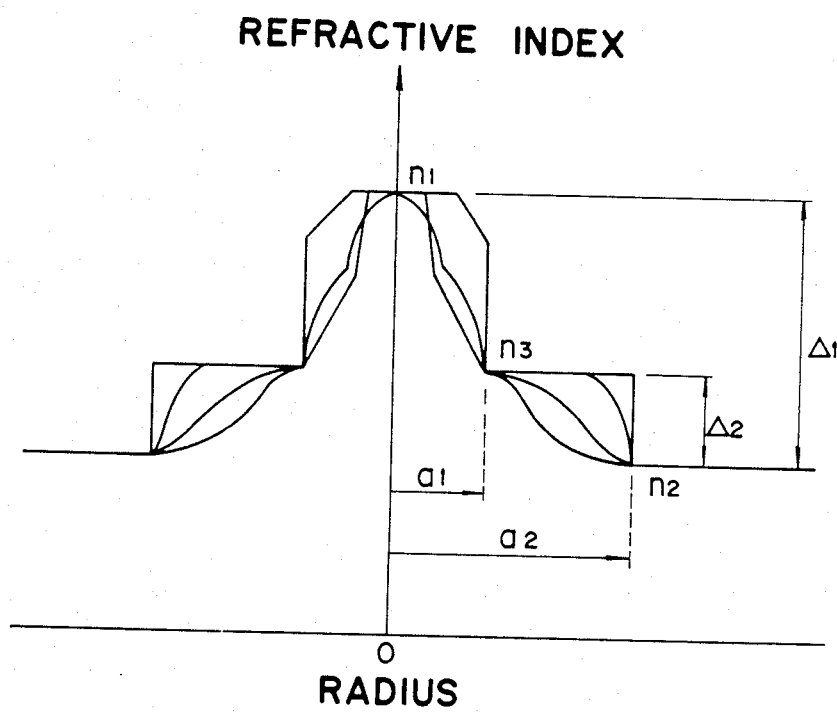

FIGS. 4A and 4B show various embodiments of step-like index profiles for both the center core and the side core. As seen from FIGS. 4A and 4B, the refractive index of the side core 2 formed on the outer periphery side of the center core 1 is $n_3$ at the innermost position, and in a region $a_2 > r > a_1$, there is at least a small portion where the refractive index is flat at $n_3$. Moreover, it is sufficient that the refractive index of this side core 2 has a value between the refractive index of the center core 1 and the refractive index of the cladding portion 3, and as long as these conditions are satisfied any type of refractive index profile may be within the scope of this invention and the present invention is not limited to a complete or substantial step-type index profile.

Here, a refractive index difference is formed between the maximum refractive index $n_3$ of the side core 2 and the maximum refractive index $n_1$ of the center core 1. In other words, in the present invention, the refractive index profile of the center core 1 is basically not limited, and any profile is acceptable as long as there is a step-like difference between the refractive indices of the above-mentioned lower refractive index core or side core 2 and the center core 1.

In the present invention, the term "step-like refractive index profile" for the center core is widely defined to include a profile in which there exists a difference $n_1 - n_3 (> 0)$ between the maximum refractive index $n_1$ of the center core and the maximum refractive index $n_3$ of the side core and is not limited to a complete step index profile as shown in FIG. 2 and also includes a graded-type index profile as shown in FIG. 3, and triangular and trapezoidal index profiles as shown in FIGS. 4A and 4B.

Furthermore, the term "step-like refractive index profile" for the side core is widely defined to include a profile in which there exists a difference $n_3 - n_2 (> 0)$ between the maximum refractive index $n_3$ of the side core and the refractive index $n_2$ of the cladding portion, including the profiles as shown in FIG. 2 and FIG. 3, or the profiles as shown in FIGS. 4A and 4B.

As mentioned before, index profiles of the center core and side core are step-like refractive index profiles including step-type, graded-type triangular-type, trapezoidal-type, and substantially step-type refractive index profiles as shown in FIGS. 2, 3, 4A and 4B.

In an optical fiber according to the present invention, power propagating through the optical fiber is mostly trapped in the center core, while the mode field diameter is widened by the side core. The side core, however, also has a trapping effect of power, so that the optical fiber according to the present invention can improve its bending characteristics, even if the mode field diameter is increased.

Next, an explanation will be made of how zero-chromatic dispersion waveguide parameters are obtained. In general, the following equation is used to express the chromatic dispersion $\sigma$ of a single mode optical fiber:

$$\sigma = \frac{1}{c\lambda} k \frac{d^2\beta}{dk^2} \quad (1)$$

Here, c and $\lambda$ denote the light velocity in vacuum and wavelength of light, respectively. $k (= 2\pi/\lambda)$ is a wave number and $\beta$ is a propagation constant of the fundamental $HE_{11}$ mode. $kd^2\beta/dk^2$ in equation (1) is expressed as follows.

$$K\frac{d^2\beta}{dk^2} = k\frac{dN_2}{dK} + k\frac{d(N_1 - N_2)}{dK} \cdot \frac{d(V_b)}{dV} + \quad (2)$$

$$(N_1 - N_2)V\frac{d^2(V_b)}{dV^2}$$

where, $$V = a(k^2n_1^2 - k^2n_2^2)^{\frac{1}{2}} = akn_1(2\Delta)^{\frac{1}{2}}$$

$$b = \frac{\left(\frac{\beta}{k}\right)^2 - n_2^2}{n_1^2 - n_2^2}$$

$$N_i = n_i + kdn_i/dk \ (i = 1,2)$$

Here, a is the core radius and $n_1$ and $n_2$ are the refractive indices of the core and the cladding portion, respectively. Furthermore, V is a normalized frequency, and b is a normalized propagation constant. $N_1$ and $N_2$ are group refractive indices of the core and cladding portion, respectively. In a case such as an optical fiber according to the present invention having a non-uniform core formed from the center and side cores 1 and 2 which do not have uniform refractive index profiles, it is convenient to use a normalized frequency T as defined by the following equation instead of the value V.

$$T^2 = 2k^2 \int_{n(r) > n_2} (n^2(r) - n_2^2)rdr$$

Here, k is a wave number in vacuum, n(r) is a refractive index at a distance r from the center of the core and $n_2$ is the refractive index of the cladding portion.

Here, the T value is equal to the V value when the refractive index profile is a step-index profile, so that the T value can be considered as an effective V value for a refractive index profile deviated from a step-index fiber. In this case, the terms $d(Vb)/dV$ and $Vd^2(vb)/dv^2$ showing the dispersion relating to the waveguides of equation (2) can be replaced with the following:

$$d\frac{(Vb)}{dV} = d\frac{(Tb)}{dT}$$

$$V\frac{d^2(Vb)}{dV^2} = T\frac{d^2(Tb)}{dT^2}$$

The chromatic dispersion is obtained from equations (2) and (1). The first term on the right side of equation (2) represents the material dispersion. The third term is represents the waveguide dispersion. The second term a cross-term for the waveguide dispersion and the material dispersion. The material dispersion can be calculated from the Sellmeier equation, and the waveguide dispersion can be calculated by obtaining a propagation constant of the fundamental $HE_{11}$ mode. The propagation constant can be obtained by solving a wave equation. In case of an optical fiber having a non-uniform core, a value of the propagation constant can be obtained by dividing the refractive index profile into a plurality of layers to find a electromagnetic field profile at each layer and then by calculating the propagation constant from the boundary conditions of electromagnetic field components in each layer. Details of these operations can be found in the paper entitled "On the accuracy of scalar approximation technique in optical fibre analysis," by K. Morishita et al, at pp. 33–36 of IEEE Tran. Microwave Theory Tech. Vol. MTT-28, 1980 and in the paper entitled "An exact analysis of cylindrical fiber with index distribution by matrix method and its application to focusing fiber," by T. Tanaka et al, at pp. 1–8 of Trans. IECE Japan, Vol. E-59, No. 11, 1976.

On the other hand, the fiber parameters realizing the zero dispersion can be found by calculating equation (1). For further details, refer to the paper entitled "Dispersionless Single-Mode Light Guides With $\alpha$ Index Profiles," by U.C. Paek et al, at pp. 583–598 of The Bell System Technical Journal, Vol. 60, No. 5, May-June 1981, and to the paper entitled "Tailoring Zero Chromatic Dispersion into the 1.5–1.6$\mu$m Low-Loss Spectral Region of Single-Mode Fibers," by L. G. Cohen et al, at pp. 334–335 of Electronics Letters, Vol. 15, No. 12, June 7, 1979.

Figure 5:
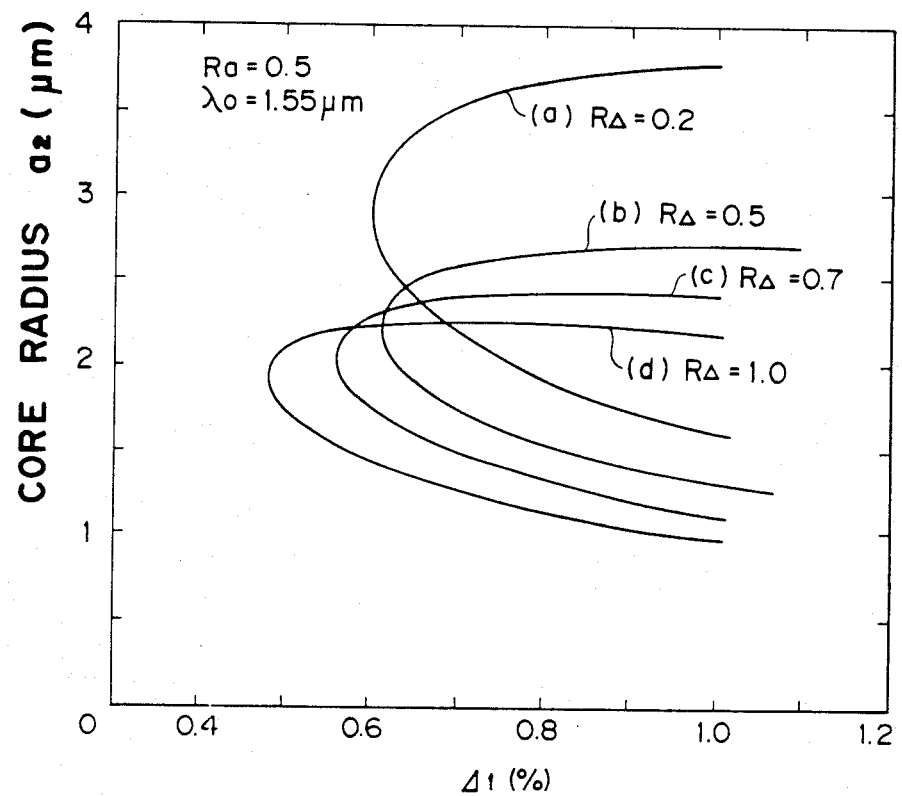
FIG. 5 and FIG. 6 are characteristics curve graphs, each illustrating a relationship between a side core radius a2 and a relative refractive index difference $\Delta_1$ in case of zero dispersion at 1.55μm.
Figure 6:
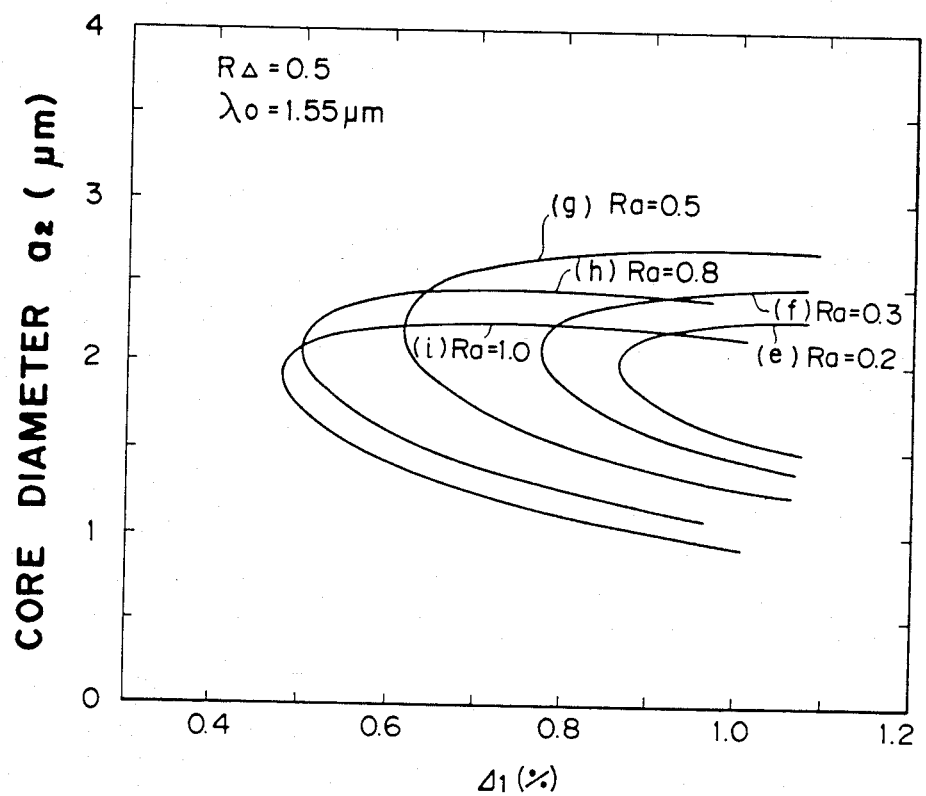

FIGS. 5 and 6 show the results of calculations obtained by the calculation method described above for the relationship between the fiber parameter $\Delta 1$ and $a_2$ which produces zero dispersion at a wavelength of 1.55$\mu$m in an embodiment of an optical fiber in which the center core has a step-index as shown in FIG. 2.

In FIG. 5, Ra($=a_1/a_2$) is 0.5 and R$\Delta$ is a parameter. In FIG. 5, curves (a), (b), (c) and (d) show the relationships when R$\Delta$ is 0.2, 0.5, 0.7 and 1.0, respectively. In FIG. 5, the curve (a) when R$\Delta$=0.2, for example, shows that if $\Delta 1$=0.7%, there are two core radii 2.2$\mu$m and 3.5$\mu$m which produce zero dispersion at 1.55$\mu$m. In general, the bending loss grows larger when the core diameter is small, and consequently a larger core diameter is selected when designing an optical fiber. In this case, $a_2$ is 3.5$\mu$m and $a_1$ is 1.75$\mu$m.

FIG. 6 shows relationships between parameters Ra that produce zero dispersion at 1.55$\mu$m when R$\Delta$=0.2. In FIG. 6, curves (e), (f), (g), (h) and (i) show relationships between the core radius $a_2$ and $\Delta 1$ when Ra is 0.2, 0.3, 0.5, 0.8 and 1.0, respectively.

It can be seen from FIGS. 5 and 6 that in case of an optical fiber in which the center core has a step-index profile, $\Delta 1$ must be equal to or greater than 0.005 in order to obtain zero dispersion at 1.55$\mu$m. It is also noted that for an optical fiber in which the center core has a graded-index profile as shown in FIG. 3, $\Delta 1$ must be equal to or greater than 0.007 in order to produce zero dispersion at 1.55$\mu$m. The result was obtained by performing the same calculations as in the cases of FIG. 5 and FIG. 6.

Figure 7:
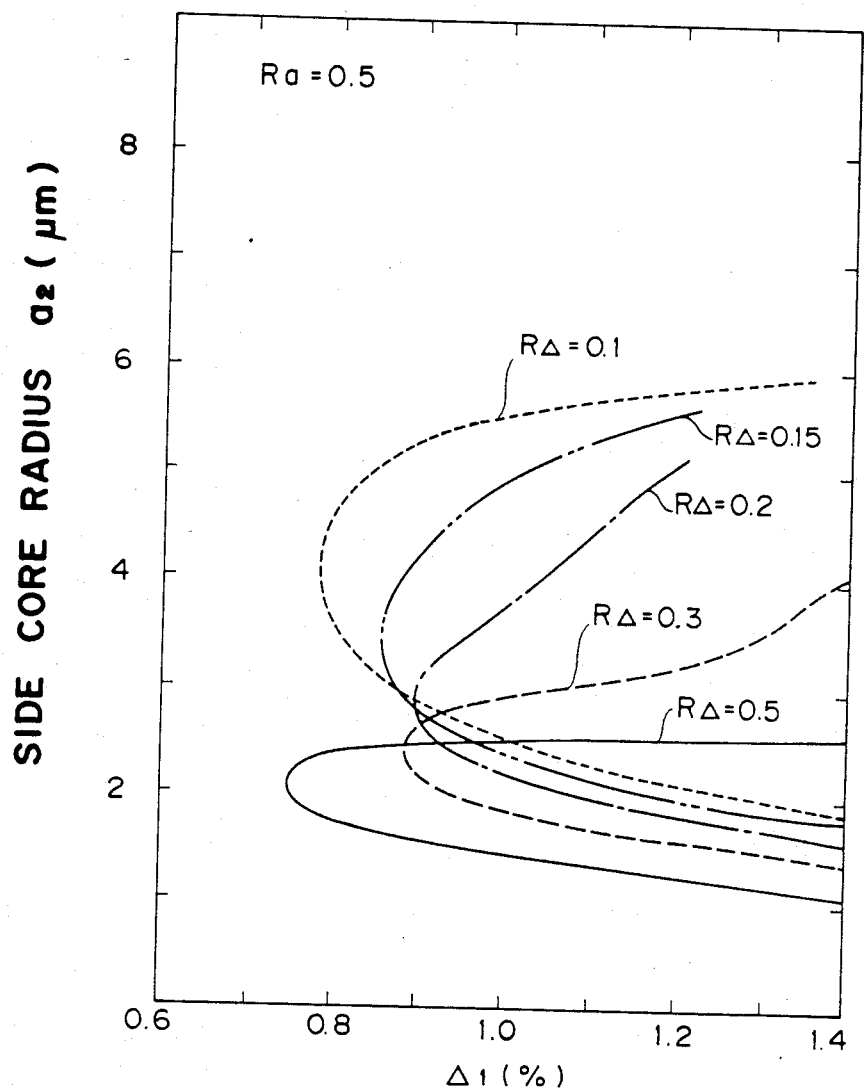
FIG. 7 illustrates a relationship between a core radius a2 and a relative refractive index difference $\Delta_1$ in a case that the center core is a graded type in which zero dispersion occurs at 1.55μm in the embodiment of the present invention shown in FIG. 3.

FIG. 7 shows results of calculations for the relationship between parameters R$\Delta$ which produce zero dispersion at 1.55$\mu$m where Ra=0.5 in case of an optical fiber in which the center core has a graded-index profile as shown in FIG. 3. It can be seen from FIG. 7 that when the center core has a graded-index profile, $\Delta 1$ must be greater than 0.007 in order to produce zero dispersion at 1.55$\mu$m.

Figure 8:
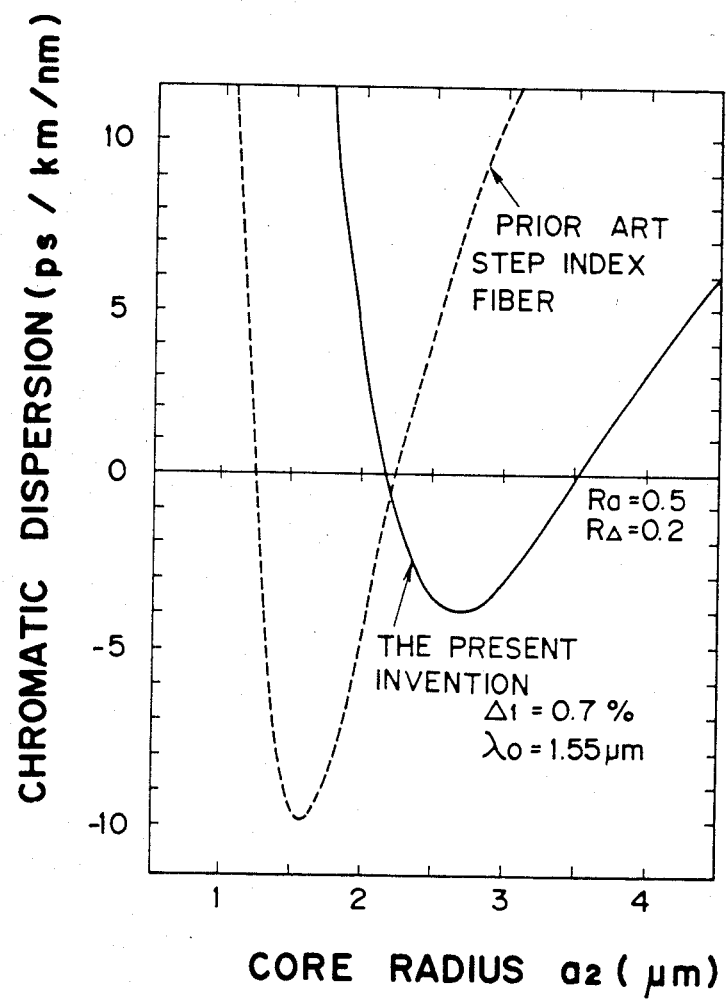
FIG. 8 is a characteristics curve graph illustrating relationships of a chromatic dispersion with a change in a core diameter when $\Delta_1 = 0.7\%$ between a prior art step-index optical fiber and an optical fiber according to the present invention.

Furthermore, FIG. 8 illustrates a comparison between changes in chromatic dispersion with respect to changes in the core radius when $\Delta 1$=0.7% in a prior art step-index optical fiber with those in an optical fiber according to the present invention whose center core has a step-index profile. In FIG. 8, a solid line denotes results of calculations for a relationship between changes in the chromatic dispersion of an optical fiber according to the present invention and a core radius $a_2$ when $R\Delta=0.2$ and $Ra=0.5$. Furthermore, a broken line shows that relationship for a prior art step-index 1.5μm zero dispersion optical fiber.

As can be seen from FIG. 8, there are two core radii which produce zero chromatic dispersion at a wavelength of $\lambda_0=1.55\mu m$. Here, the smaller core radius has poor bending characteristics, and therefore cannot be used in designing an optical fiber. Consequently, in the case of the larger core radius where zero dispersion occurs, a higher accuracy in the value of the core radius $a_2$ is not required as the gradient of the dispersion with respect to the core radius is smaller, and hence the control of dispersion is facilitated in this case.

As is clear from FIG. 8, in a structure of an optical fiber according to the present invention, there is less variation in chromatic dispersion with respect to changes in the core radius, compared with that in a prior art step-index optical fiber. Consequently, there is an advantage that the zero dispersion wavelength can easily be controlled when manufacturing an optical fiber according to the present invention.

Figure 9:
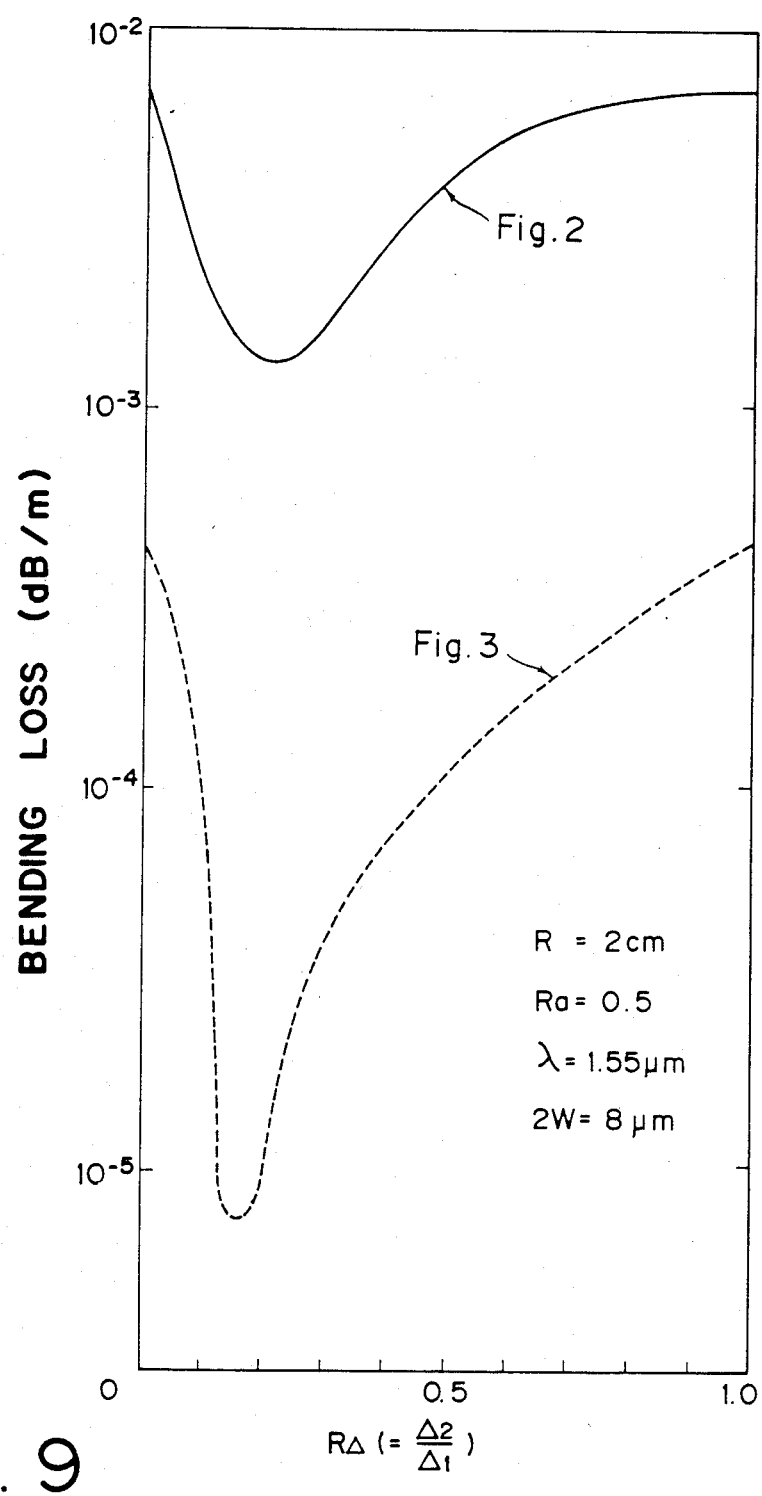
FIG. 9 is a characteristics curve graph illustrating bending loss characteristics for a bending radius of 2cm when the mode field diameter is constant at 8μm and $R\Delta$ is changed in case of Ra=0.5 in the embodiments of the present invention shown in FIGS. 2 and 3.

FIG. 9 shows results of calculations of a bending loss at a bending radius of 2cm when a mode field diameter as defined by the electric field of a fundamental mode of a single mode optical fiber is constant. Here, Ra is 0.5 and $R\Delta$ is varied. The data in FIG. 9 were obtained for a wavelength λ of 1.55μm and a mode field diameter 2W of 8.0μm (W=4μm). In these calculations, under the conditions that Ra=0.5, the mode field diameter 2W is 8μm and zero dispersion occurs at 1.55μm, $a_2$ and $\Delta1$ can be determined suitably with respect to RΔ. In FIG. 9, the bending loss is calculated by using $a_2$ and $\Delta1$ determined in this manner.

In FIG. 9, a solid line shows results for the optical fiber shown in FIG. 2, and a broken line for that shown in FIG. 3. Furthermore, when RΔ=0 or 1, the optical fiber is a prior art 1.5μm zero dispersion fiber having a single core, and the solid line indicates a prior art step-index 1.5μm zero dispersion optical fiber at RΔ=0 and 1, and the broken line indicates a prior art graded-index 1.5μm zero dispersion optical fiber.

As can be seen from FIG. 9, changing the refractive index profile of the center core 1 from a step-index profile to a graded-index profile allows for a significant improvement in bending characteristics. Consequently, bending characteristics are largely improved by changing the refractive index profile of the center core 1.

Figure 10:
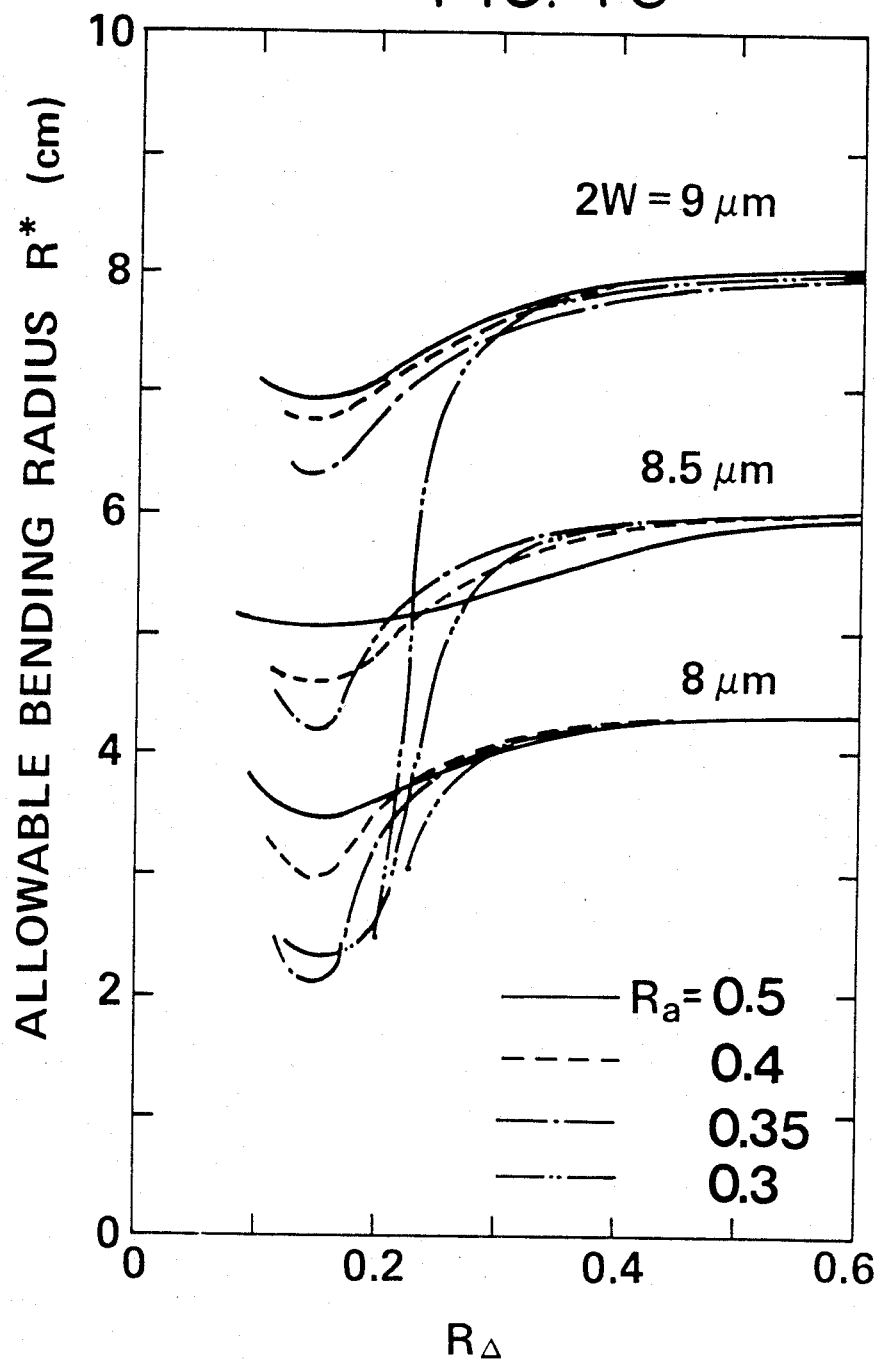
FIG. 10 is a characteristics curve graph illustrating an allowable bending radius when Ra and $R\Delta$ are changed for mode field diameters 2W of 8 μm, 8.5 μm and 9 μm in the optical fiber according to the present invention shown in FIG. 3.

FIG. 10 shows bending characteristics in the embodiment shown in FIG. 3, that is, the optical fiber in which the center core 1 has the graded-index profile. In FIG. 10, an allowable bending radius R* is used instead of a bending loss value. The allowable bending radius R* is defined as a bending radius which results in a loss value of 0.01dB/km when an optical fiber is wound around a mandrel having a constant diameter. The allowable bending radius R* corresponds to the amount of the bending loss. The smaller the allowable bending radius, the smaller will be the value of the bending loss.

In FIG. 10, it can be seen that the bending loss characteristics can be improved by selecting a value of RΔ from 0.1 to 0.3. That is, favorable bending characteristics can be obtained by selecting RΔ and Ra. Values in a range of $0.1 \leq R\Delta \leq 0.3$ offers the optimum bending loss characteristics. The splice loss is given as a function of the mode field diameter. Therefore, in order to have a constant splice loss, the comparison of bending characteristics has been made here under the condition that the mode field diameter is constant.

Figure 11:
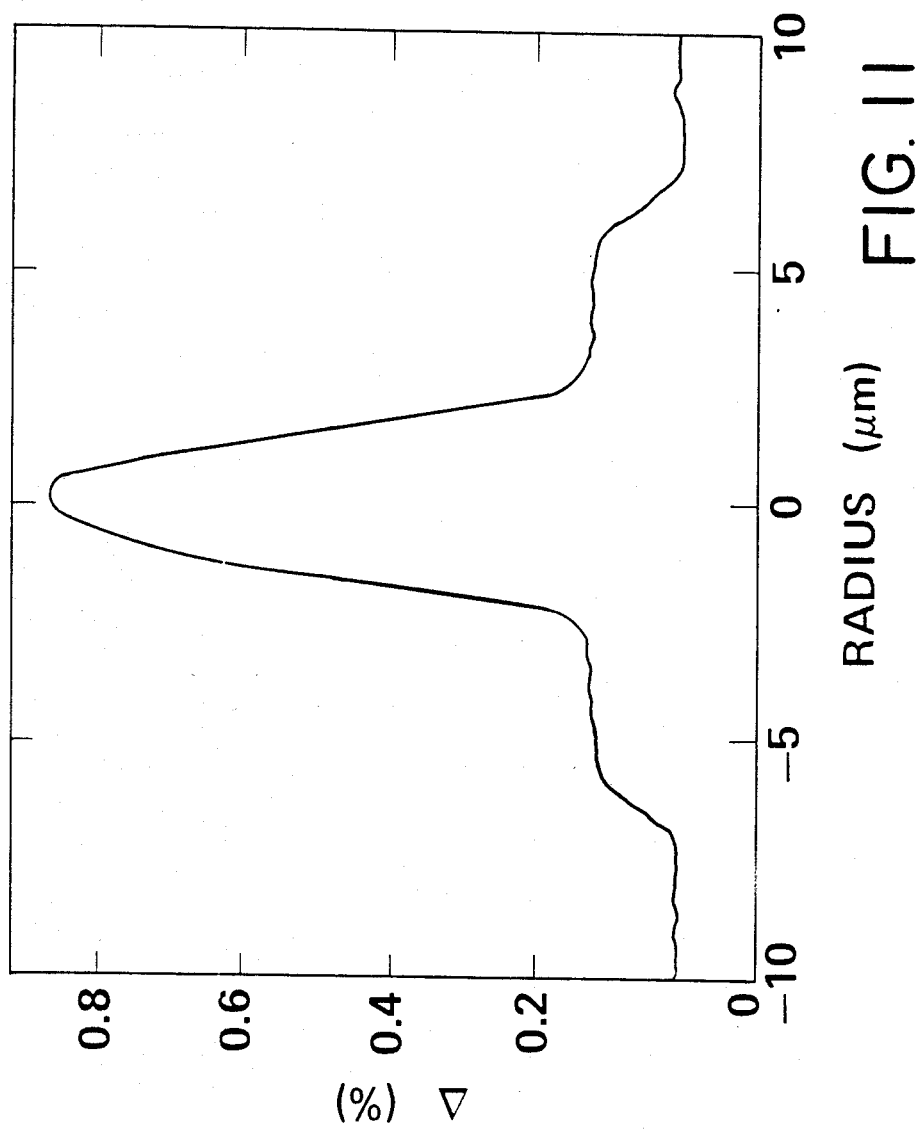
FIG. 11 illustrates a refractive index profile in a specific embodiment of an optical fiber according to the present invention that was actually manufactured.
Figure 12:
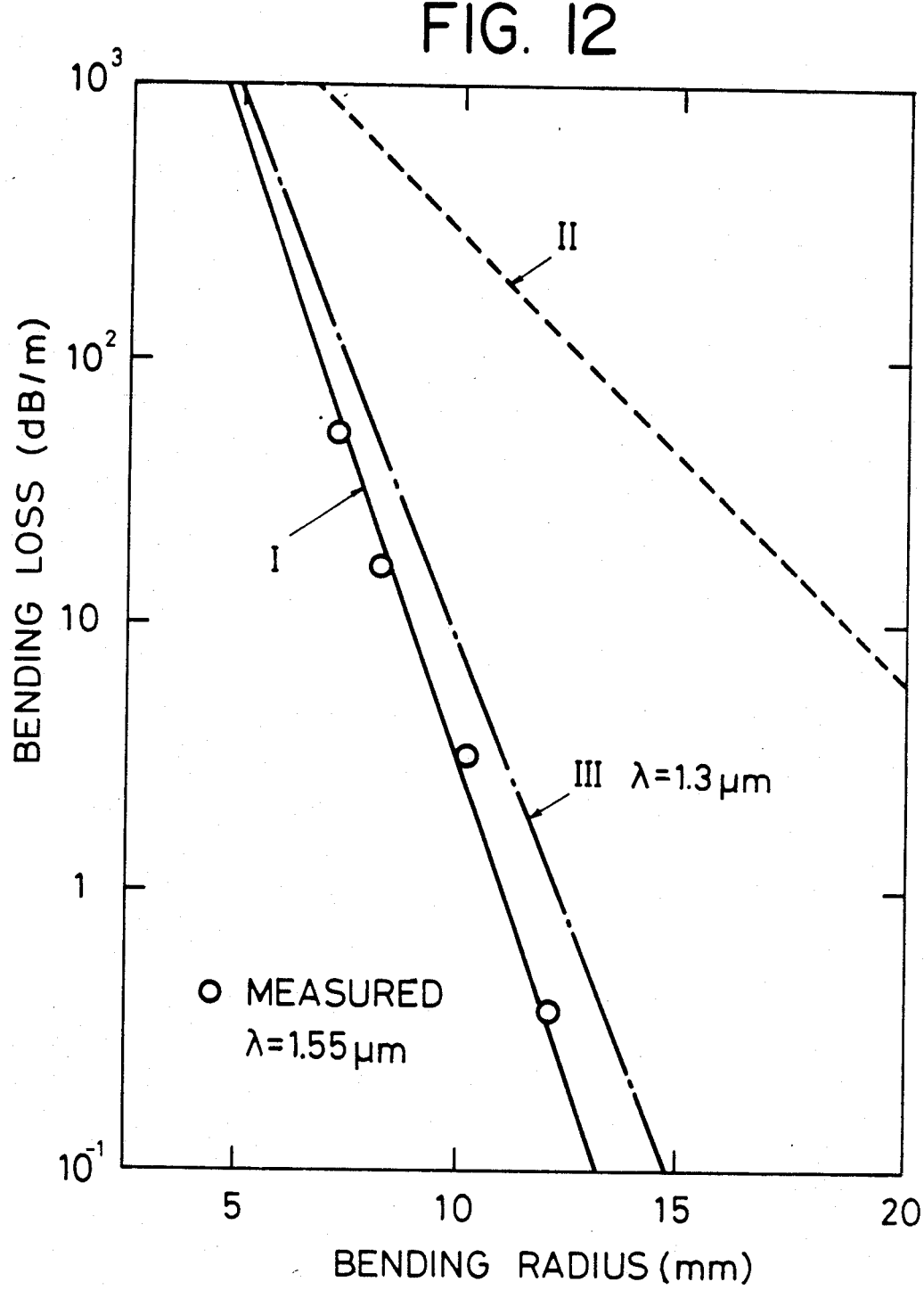
FIG. 12 is a characteristics curve graph illustrating comparatively measured values of bending loss characteristics (curve I) in an optical fiber according to the present invention shown in FIG. 11, bending loss characteristics in a graded index 1.5 μm zero dispersion optical fiber (broken line curve II) and in a 1.3 μm zero dispersion optical fiber (dash-and-dotted line curve III) ($\lambda = 1.3$ μm).

FIG. 11 shows a refractive index profile of a specific embodiment of an optical fiber according to the present invention. In this case, RΔ=0.15 and Ra=0.3. Furthermore, measured values of the bending loss characteristics of this optical fiber are shown in FIG. 12 by a circle when the mode field diameter 2W=8.6μm. In FIG. 12, a solid curve I is the best fitted curve to the actually measured values. For purposes of comparison, bending loss characteristics are also shown for a prior art graded-index 1.5μm zero dispersion optical fiber (broken line II, 2W=8.5μm) and for a 1.3μm zero dispersion optical fiber (dash-and-dotted line III, λ=1.3μm).

It can be seen clearly in FIG. 12 that the characteristics I of the optical fiber according to the present invention are much superior to the bending characteristics III of the prior art 1.3μm zero dispersion fiber. Moreover, it can also be seen clearly that the characteristics I are far superior to the bending characteristics II for the graded-index profile zero dispersion fiber. These results confirm that no loss increases due to bending during formation into a coated fiber or a cable in case of the 1.5μm zero dispersion optical fiber.

When considering a long distance communication system, it is necessary to take into account causes of loss such as splice loss, bending loss and transmission loss in order to minimize the total loss over a repeater spacing.

As is clear from FIGS. 9, 10 and 12, an optical fiber according to the present invention offers a smaller bending loss than a prior art step-index optical fiber. Accordingly, under the condition that the total splice loss included in the transmission line is constant, an optical fiber according to the present invention allows for a greater possible transmission line length at which a predetermined loss value is attained and therefore the optical fiber is effective in increasing repeater spacing.

The optical fiber according to the present invention as explained above makes it possible to make the bending loss lower than that at 1.3μm for a prior art 1.3μm zero dispersion fiber. As a result, it is possible to supress any increase in loss cabling process to a far greater extent than in the case of optical fibers having other profiles. Accordingly, the present invention offers a large effect in extending repeater spacing. Since the mode field diameter can be increased without deteriorating the bending characteristics, the splice loss can be effectively reduced. Furthermore, the chromatic dispersion varies only to a small extent with respect to changes in the core diameter, so that there is an advantage of good controllability of the zero dispersion wavelength. Moreover, the refractive index profile of the core in an optical fiber according to the present invention is simpler than the segment-core-index profile optical fiber disclosed in European Patent Application Laying-open No. 0127408, so that it is easier to control the refractive index distribution. Consequently, an optical fiber according to the present invention can be manufactured by the VAD method, thereby allowing for high speed synthesis of the optical fiber. Furthermore, an optical fiber according to the present invention also offers an advantage in that it can be manufactured extremely simply under any kind of conventional manufacturing process for an optical fiber including the VAD method and the MCVD method. Moreover, an optical fiber according to the present invention has an ultra-wide bandwidth and a low loss, and hence can be used as a long-distance, optical trunk transmission line with an extremely large transmission capacity.

What is claimed is:

1. A zero dispersion single mode optical fiber for transmission in the 1.5 μm wavelength region, comprising:
   a center core having a radius $a_1$ and a maximum refractive index $n_1$;
   a side core disposed on an outer side of said center core, said side core having a radius $a_2$ and a maximum refractive index $n_3$ which is lower than the maximum refractive index $n_1$ of said center core; and
   a cladding portion disposed on an outer side of said core having a refractive index $n_2$;
   each of the refractive indices of said center core and said side core having a step-like profile in the direction of the radius of said optical fiber; and wherein the radii $a_1$ and $a_2$, the relative refractive index difference $\Delta_1=(n_1^2-n_2^2)/2n_1^2$ and the relative refractive index difference $\Delta_2=(n_3^2-n_2^2)2n_3^2$ are determined by all of the following factors:
   (1) $0.1 \leq R\Delta \leq 0.3$, where $R\Delta = \Delta_2/\Delta_1$;
   (2) $\Delta_1 \geq 0.005$;
   (3) $0 < R_a < 1$, where $R_a = a_1/a_2$
   (4) the chromatic dispersion $\sigma=(k/c\lambda)d^2\alpha/dk^2)$ of said single mode optical fiber showing zero dispersion in said 1.5 μm wavelength region, where c is the velocity of light in a vacuum, $\lambda$ is the wavelength of light, $k=2\pi/\lambda$ is the wavenumber and $\beta$ is the propagation constant of the $HE_{11}$ mode; and
   (5) the predetermined mode field diameter.

2. A single mode optical fiber as claimed in claim 1, wherein said profile of said side core has at least a small portion having a constant refractive index from the innermost position of said profile of said side core.

3. A single mode optical fiber as claimed in claim 1, wherein said center core has a graded-type refractive index profile.

4. A single mode optical fiber as claimed in claim 1, wherein said center core has a step-type or substantially step-type refractive index profile.

5. A single mode optical fiber as claimed in claim 1, wherein said center core has a triangular refractive index profile.

6. A single mode optical fiber as claimed in claim 1, wherein said center core has a trapezoidal refractive index profile.

7. A single mode optical fiber as claimed in claim 1, wherein said side core has a step-type or substantially step-type refractive index profile.

8. A single mode optical fiber as claimed in claim 2, wherein said center core has a graded-type refractive index profile.

9. A single mode optical fiber as claimed in claim 2, wherein said center core has a step-type or substantially step-type refractive index profile.

10. A single mode optical fiber as claimed in claim 2, wherein said center core has a triangular refractive index profile.

11. A single mode optical fiber as claimed in claim 2, wherein said center core has a trapezoidal refractive index profile.

12. A single mode optical fiber as claimed in claim 2, wherein said side core has a step-type or substantially step-type refractive index profile.

13. A single mode optical fiber as claimed in claim 3, wherein said side core has a step-type or substantially step-type refractive index profile 14. A single mode optical fiber as claimed in claim 4, wherein said side core has a step-type or substantially step-type refractive index profile.

* * * * *